W. B. WHEELER.
ADVERTISING DEVICE.
APPLICATION FILED JAN. 28, 1920.
1,353,105.
Patented Sept. 14, 1920.
3 SHEETS—SHEET 1.
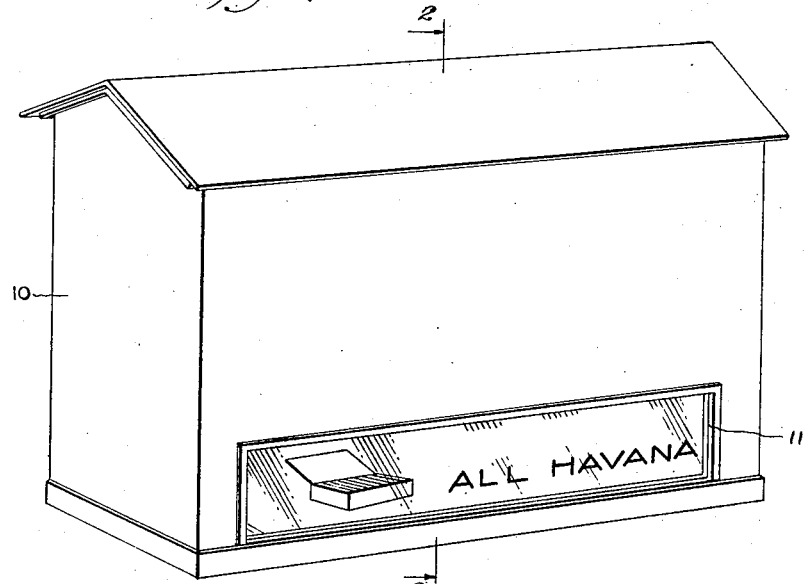
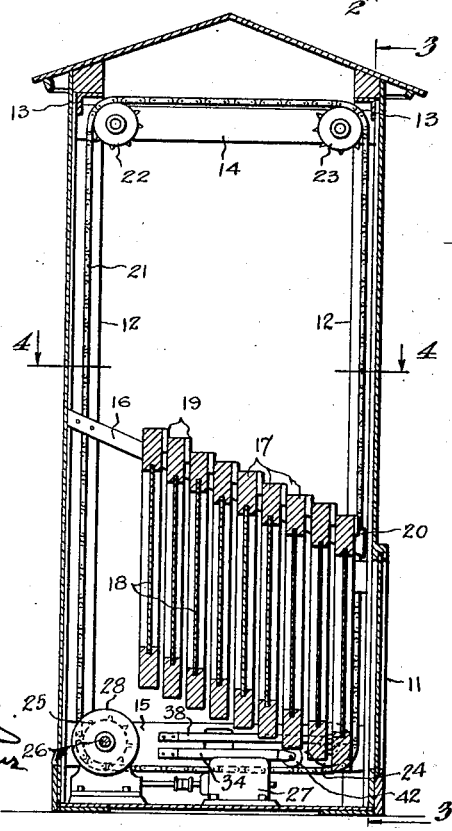
WITNESSES
INVENTOR
WELLINGTON B. WHEELER,
BY
ATTORNEYS

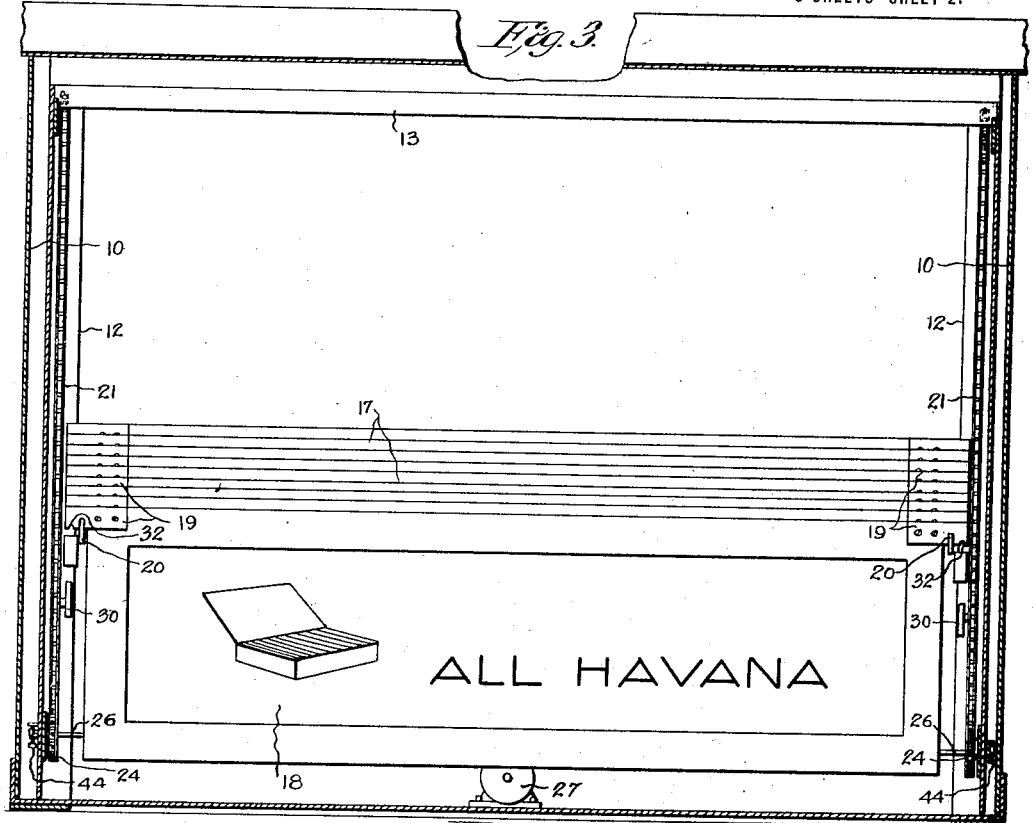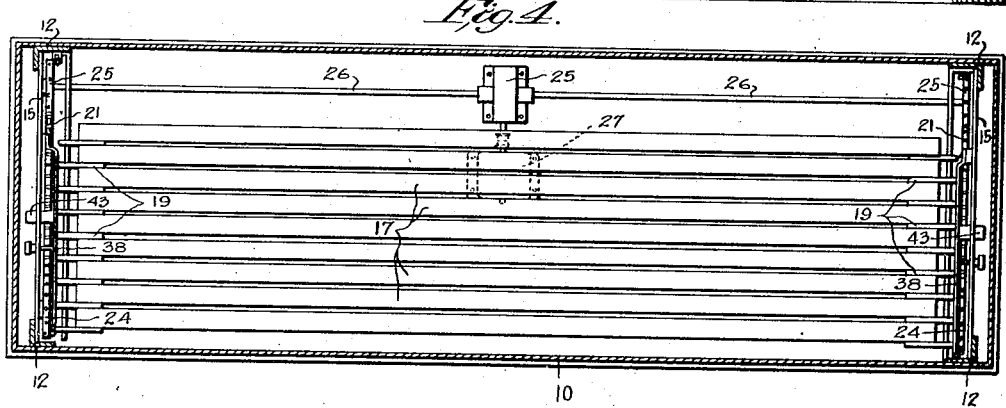

W. B. WHEELER.
ADVERTISING DEVICE.
APPLICATION FILED JAN. 28, 1920.
1,353,105.
Patented Sept. 14, 1920.
3 SHEETS—SHEET 3.
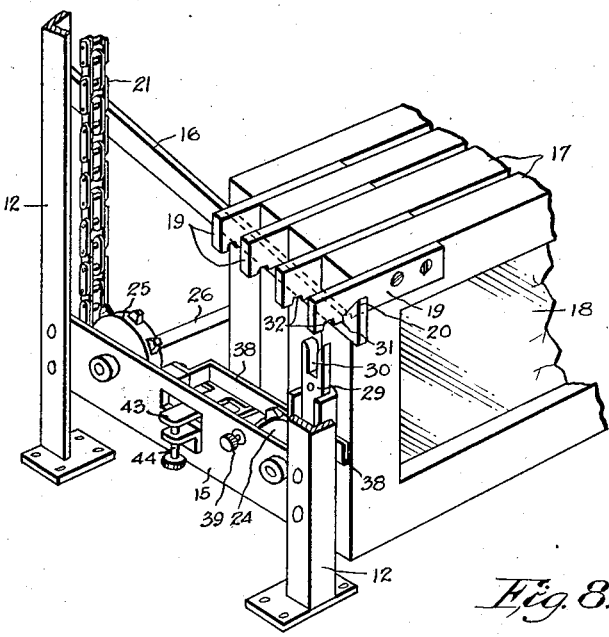
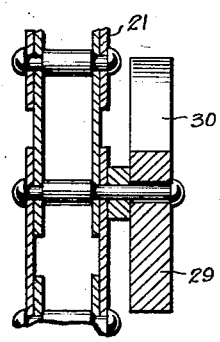
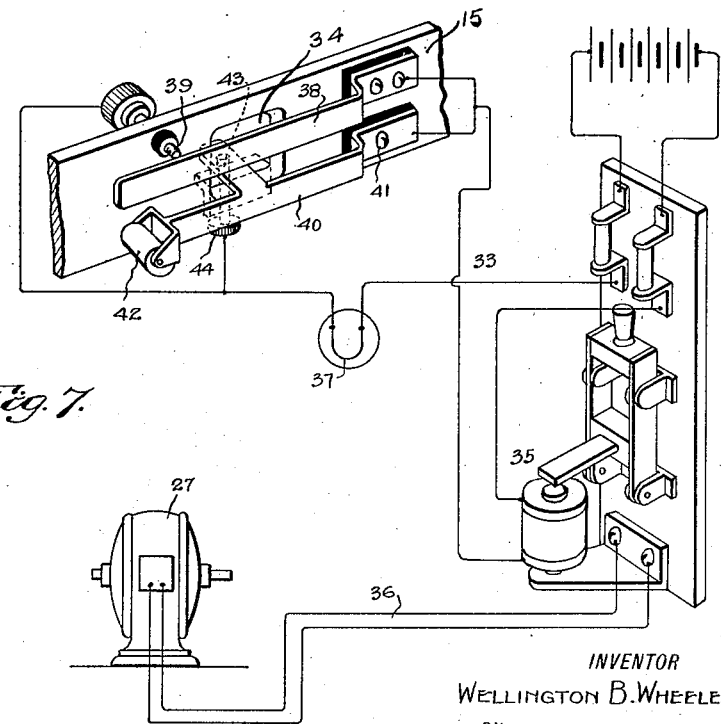
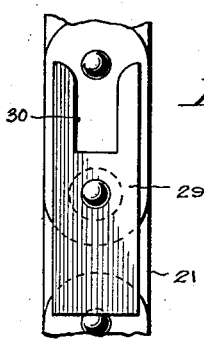
WITNESSES
INVENTOR
WELLINGTON B. WHEELER
BY
ATTORNEYS

UNITED STATES PATENT OFFICE.

WELLINGTON BRAZIL WHEELER, OF EL SEGUNDO, CALIFORNIA.

ADVERTISING DEVICE.

1,353,105. Specification of Letters Patent. Patented Sept. 14, 1920.

Application filed January 28, 1920. Serial No. 354,630.

*To all whom it may concern:*

Be it known that I, WELLINGTON B. WHEELER, a citizen of the United States, and a resident of El Segundo, California, have invented a new and Improved Advertising Device, of which the following is a full, clear, and exact description.

This invention relates to advertising devices and particularly to automatic devices of this class.

Some of the principal objects and advantages sought to be accomplished by this invention are; to produce a simple and effective advertising device including a plurality of display panels and mechanism for singly visualizing said panels successively for a predetermined period of time; to provide a device of this character which includes detecting and stopping means for automatically rendering the mechanism inactive upon a faulty or imperfect functioning of the elements, in order to prevent possible resultant injury thereto; and to provide means for indicating and signaling the condition of the mechanism.

With these and other objects in view which will be more readily apparent from the following description and claims, reference is made to the accompanying drawings forming a part of this application, in which:

Figure 1 is a perspective view of the device.

Fig. 2 is a transverse sectional view therethrough taken approximately on the line 2—2 of Fig. 1.

Fig. 3 is a longitudinal sectional view taken on the line 3—3 of Fig. 2.

Fig. 4 is a horizontal sectional view taken on the line 4—4 of Fig. 2.

Fig. 5 is a fragmentary detail perspective view of the frame and its coöperating parts removed from the casing.

Fig. 6 is an enlarged detail section of the conveyer device for removing the panels.

Fig. 7 is an enlarged detail elevation of the same, and

Fig. 8 is a diagrammatic view of the electric circuit and its coöperating parts.

Referring to the drawings by characters of reference, which denote like parts throughout the several views of the drawings, 10 designates a casing or housing which is provided with a window opening 11 in one of its side walls. A frame work for supporting the operating mechanism is arranged within the housing and consists of uprights 12, upper longitudinal connecting bars 13, and transverse braces 14 and 15, disposed respectively at the upper and lower extremities of said uprights. Inclined guides 16 are supported by the rear uprights 12 and are inclined downwardly toward the window opening 11, their free terminals being disposed immediately above the upper edge of said window opening. A plurality of elements containing advertising indicia are adapted to be supported by the inclined guides 16 and said elements are here illustrated as frames 17, in which panels 18 are received, upon which is printed the advertising matter. The frames 18 are each provided with outwardly extending ears 19, secured respectively to the upper portion of the opposite extremities thereof for normally supporting and suspending the panels from the guides 16 where they are free to gravitate toward the lower free end of said guides. Stops 20 in the nature of lugs formed at the free extremity of each guide 16 serve as a means for preventing the frames from gravitating entirely from the guides, the ears of the foremost frame contacting with the stops 20.

The mechanism for removing the foremost frame from the guides and depositing it thereon at the rear of the remaining frames comprises endless chains 21 disposed at either end of the frame work and mounted upon the sprockets 22, 23, 24, and 25, the latter being keyed to the opposite ends of a transverse shaft 26 which is driven by a motor 27 through suitable gears for reducing the speed of the shaft below the motor speed. The remaining sprockets 22, 23 and 24 merely serve as idlers over which the chains 21 are guided. The sprockets 22 and 23 are supported by the cross braces 14 while the remaining sprockets 24 and 25 are supported by the cross braces 15 and it is understood that suitable means (not shown) for connecting the upper brace 14 to the uprights 12 may be provided which will permit of the adjustment of said brace, to increase or decrease the tension on the chains 21, when necessary. Alined devices 29, bifurcated at their upper ends as at 30, are secured to the chains, the front leads of which are adapted to travel in a path in prolongation of the longitudinal alinement of the extensions 19 and the said devices 29 are adapted to engage with and embrace the extremities of the projections 19 of the foremost frame 17 in order to remove the same from the guides 16 and deposit it thereon at the rear of the remaining frames, which will gravitate downwardly and forwardly in order to dispose the foremost of the remaining frames adjacent the extremity of the guides where its ears 19 will be engaged by and held by the stops 20. If desired, the projections 20 may be notched as at 31 and 32 to respectively co-act with the guides and devices 29 in order to maintain a truer alinement of the frames, especially during the operation of depositing a frame upon the guides. From the foregoing it will be seen that the display panels will be singly visualized successively for a predetermined period of time, as long as the motor is continued in operation.

In order to provide means for automatically rendering the mechanism inactive and indicating said condition upon a faulty or imperfect functioning of the elements, whereby to prevent possible resultant injuries thereto, a detecting and stopping means has been provided which includes a normally open controlling circuit 33 comprising a circuit closing means 34, a circuit breaker 35 for breaking the motor circuit 36, and a signal 37 in series with the circuit breaker. The circuit closing means 34 includes resilient tongues 38, secured respectively to the inner side of each transverse brace 15 and insulated therefrom and contact members 39 supported and insulated from said braces 15, said tongues traversing all of the frames at each side thereof. Should any frame become disarranged or out of alinement, it will flex one of the tongues 38 until it engages its respective contact member 39, resulting in the closing of the controlling circuit 33, thereby operating the circuit breaker 35 and signal 37 to cut off the motor 27 and indicate said condition of the device. The circuit closing means also includes arms 40 pivoted at 41 to the inner side of each brace 15 and insulated therefrom, the free extremity of each arm being provided with a roller 42 which normally engages with the upper surface of the lower lead of each chain 21 to support a contact ear 43 formed on the arm, in spaced relation with respect to a contact member 44. The arms 40 and the contact members 44 are arranged in the controlling circuit 33, in parallel with the tongues 38 and the contact members 39. Should the chain break or become too slack to operate, the arm 40 will drop allowing the ear 43 to engage the contact member 44 to cut off the motor and energize the signal.

While a single and preferred embodiment of the invention has been described and shown, the same is merely an illustration of one method of reducing the same to practice and it is understood that the right to make changes or alterations which fall within the scope of the claims, is reserved.

What is claimed as new is:—

1. An advertising device comprising a plurality of panels arranged behind one another, mechanism for removing the foremost panel and depositing the same at the rear of the remaining panels for successively visualizing said panels, and means co-acting with the panels for detecting improper alinement of said panels.

2. An advertising device comprising a plurality of panels arranged behind one another, mechanism for moving the foremost panel and depositing the same at the rear of the remaining panels for successively visualizing said panels, and means for detecting improper functioning of said removing and depositing mechanism.

3. In an advertising device the combination with a plurality of panels and mechanism associated therewith for successively exhibiting the panels, of means co-acting with the panels for detecting the improper arrangement of the same, said means comprising a tongue traversing the side of the panels, and a contact member normally spaced from said tongue and adapted to be engaged thereby when the latter is engaged by an improperly alined panel.

4. In an advertising device the combination with a plurality of panels and mechanism associated therewith for successively exhibiting said panels, of means co-acting with the panels for detecting an improper arrangement of the same, said means comprising a resilient tongue traversing the side of the panels, and a contact member, said panels when in improper alinement being arranged to move said tongue so as to engage said contact member, and indicating means actuated by said engagement.

5. In an advertising device, a plurality of panels arranged behind one another, mechanism for successively displaying said panels comprising endless conveyers, means for detecting an improper functioning of the conveyers comprising contact members and pivoted bars having their free ends normally supported by the lower leads of the conveyers for holding the same out of engagement with said contacts.

WELLINGTON BRAZIL WHEELER.